(12) United States Patent
Kuttecheri

(10) Patent No.: US 10,234,052 B2
(45) Date of Patent: Mar. 19, 2019

(54) VALVE

(71) Applicant: General Electric Technology GmbH, Baden (CH)

(72) Inventor: Abdul Basheer Kuttecheri, Kolkata (IN)

(73) Assignee: General Electric Technology GmbH, Baden (CH)

( * ) Notice: Subject to any disclaimer, the term of this patent is extended or adjusted under 35 U.S.C. 154(b) by 0 days.

(21) Appl. No.: 15/751,180

(22) PCT Filed: Aug. 3, 2016

(86) PCT No.: PCT/EP2016/068537
§ 371 (c)(1),
(2) Date: Feb. 8, 2018

(87) PCT Pub. No.: WO2017/025407
PCT Pub. Date: Feb. 16, 2017

(65) Prior Publication Data
US 2018/0231140 A1    Aug. 16, 2018

(30) Foreign Application Priority Data
Aug. 12, 2015  (IN) ............ 2483/DEL/2015

(51) Int. Cl.
*F16K 31/00* (2006.01)
*F16K 31/122* (2006.01)
*B01D 46/00* (2006.01)
*B01D 46/42* (2006.01)
*F16K 47/02* (2006.01)
*B01D 46/02* (2006.01)

(52) U.S. Cl.
CPC ...... *F16K 31/1223* (2013.01); *B01D 46/0068* (2013.01); *B01D 46/023* (2013.01); *B01D 46/4272* (2013.01); *F16K 47/023* (2013.01)

(58) Field of Classification Search
CPC ............. F16K 31/1223; F16K 47/023
USPC ................................ 251/21, 63
See application file for complete search history.

(56) References Cited

U.S. PATENT DOCUMENTS

| 463,623 | A | * | 11/1891 | Eichbaum | ............ F41B 11/72 |
| | | | | | 124/75 |
| 2,059,808 | A | * | 11/1936 | Robart | ............ G05D 16/10 |
| | | | | | 137/493 |
| 2,318,963 | A | * | 5/1943 | Parker | ............ F16K 15/026 |
| | | | | | 137/514.7 |

(Continued)

FOREIGN PATENT DOCUMENTS

| EP | 2 803 886 A2 | 11/2014 |
| EP | 2 816 269 A1 | 12/2014 |

OTHER PUBLICATIONS

International Search Report and Written Opinion issued in connection with corresponding PCT Application No. PCT/EP2016/068537 dated Nov. 25, 2016.

(Continued)

*Primary Examiner* — Umashankar Venkatesan
(74) *Attorney, Agent, or Firm* — GE Global Patent Operation; Rita D. Vacca

(57) ABSTRACT

The valve comprises a housing defining a cavity having a side wall, a ceiling and an open end, a plunge slidable within the cavity, a control device for causing the plunge movement. The cavity has at least one slot on the side wall.

8 Claims, 4 Drawing Sheets

(56) References Cited

U.S. PATENT DOCUMENTS

| | | | | |
|---|---|---|---|---|
| 2,583,295 | A * | 1/1952 | Greer | B60T 11/32 |
| | | | | 137/514.7 |
| 4,190,230 | A * | 2/1980 | Geissbuhler | B01D 46/0068 |
| | | | | 251/30.02 |
| 4,250,916 | A * | 2/1981 | Hoffmann | F16K 1/126 |
| | | | | 137/514.5 |
| 4,552,330 | A * | 11/1985 | Grotloh | F16K 31/1223 |
| | | | | 251/25 |
| 2004/0046135 | A1 * | 3/2004 | Wieder | F16K 31/122 |
| | | | | 251/63.6 |
| 2014/0124059 | A1 * | 5/2014 | McAuliffe | F16K 31/12 |
| | | | | 137/492 |
| 2014/0332038 | A1 * | 11/2014 | Appelo | B01D 46/04 |
| | | | | 134/37 |
| 2014/0332039 | A1 * | 11/2014 | Appelo | B01D 46/04 |
| | | | | 134/37 |
| 2016/0186884 | A1 * | 6/2016 | Hartmann | F16K 31/1221 |
| | | | | 251/63 |

OTHER PUBLICATIONS

Extended European Search Report and Opinion issued in connection with corresponding EP Application No. 15188167.9 dated Dec. 9, 2016.
International Preliminary Report on Patentability issued in connection with corresponding PCT Application No. PCT/EP2016/068537 dated Feb. 13, 2018.
Intention to Grant issued in connection with corresponding EP Application No. 15188167.9 dated Mar. 15, 2018.

* cited by examiner

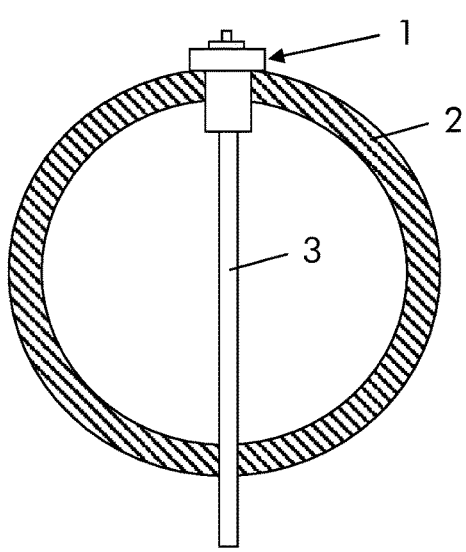
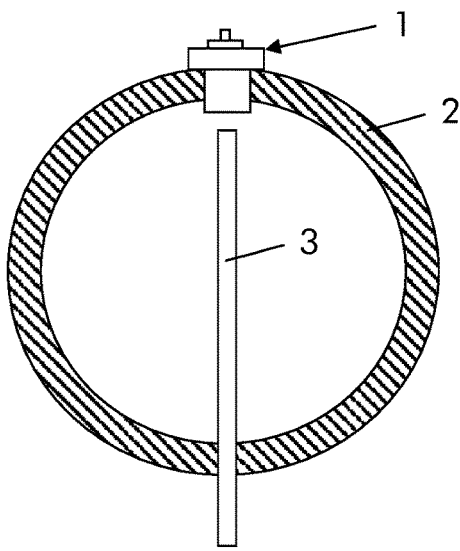
Fig. 1  Fig. 2
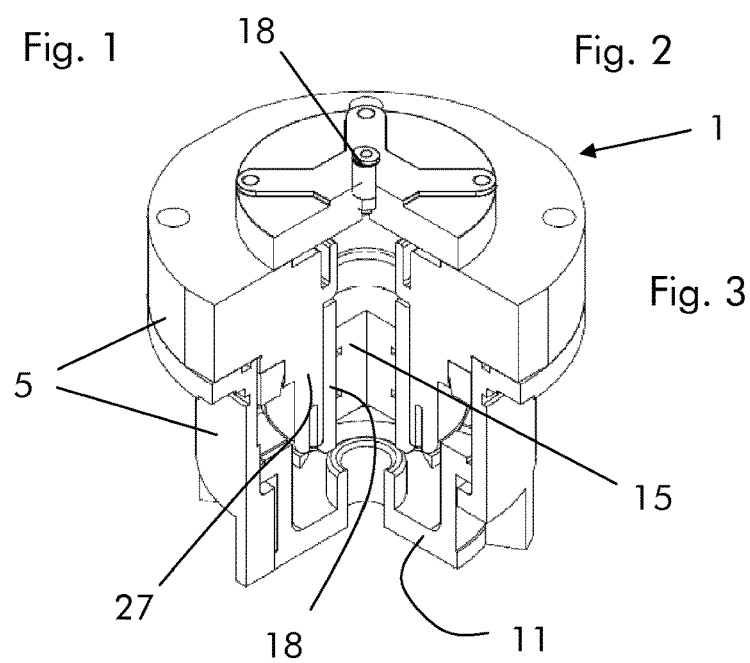
Fig. 3
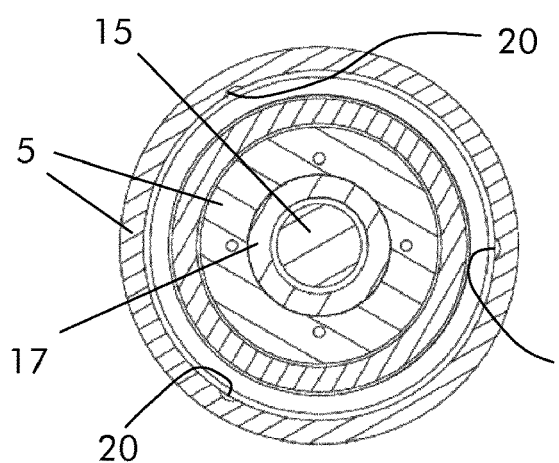
Fig. 4

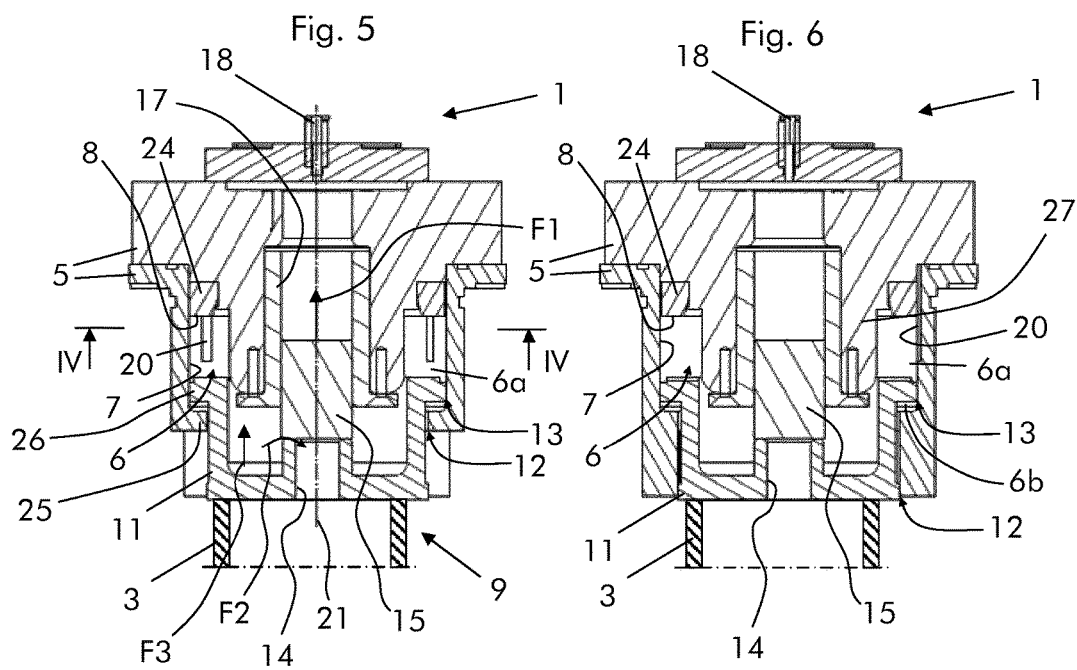
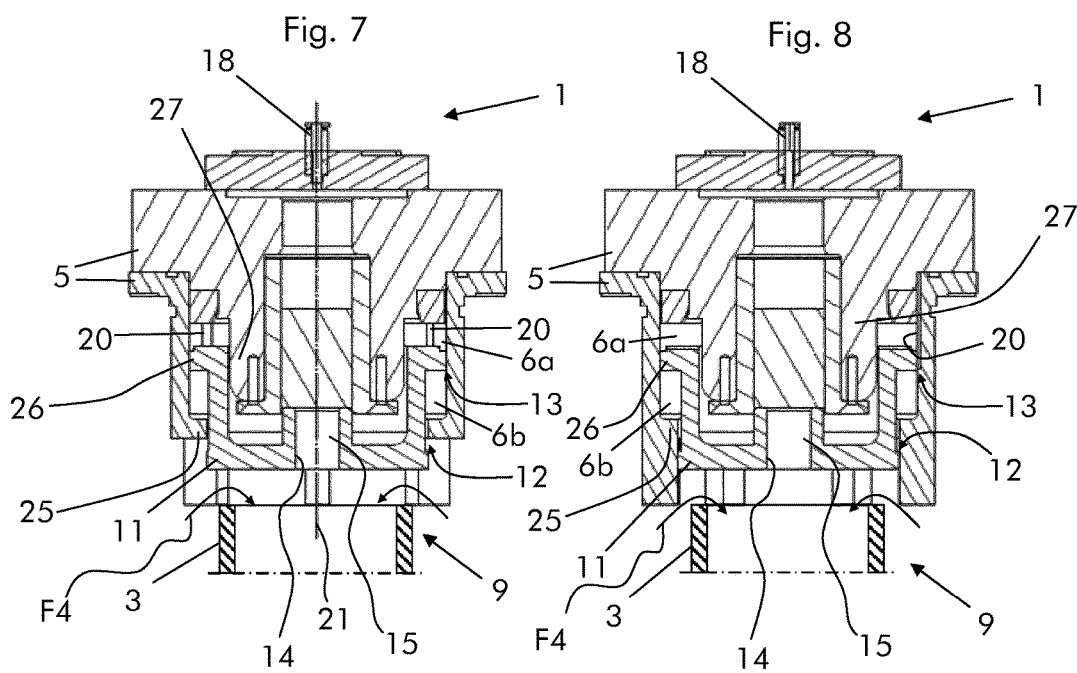

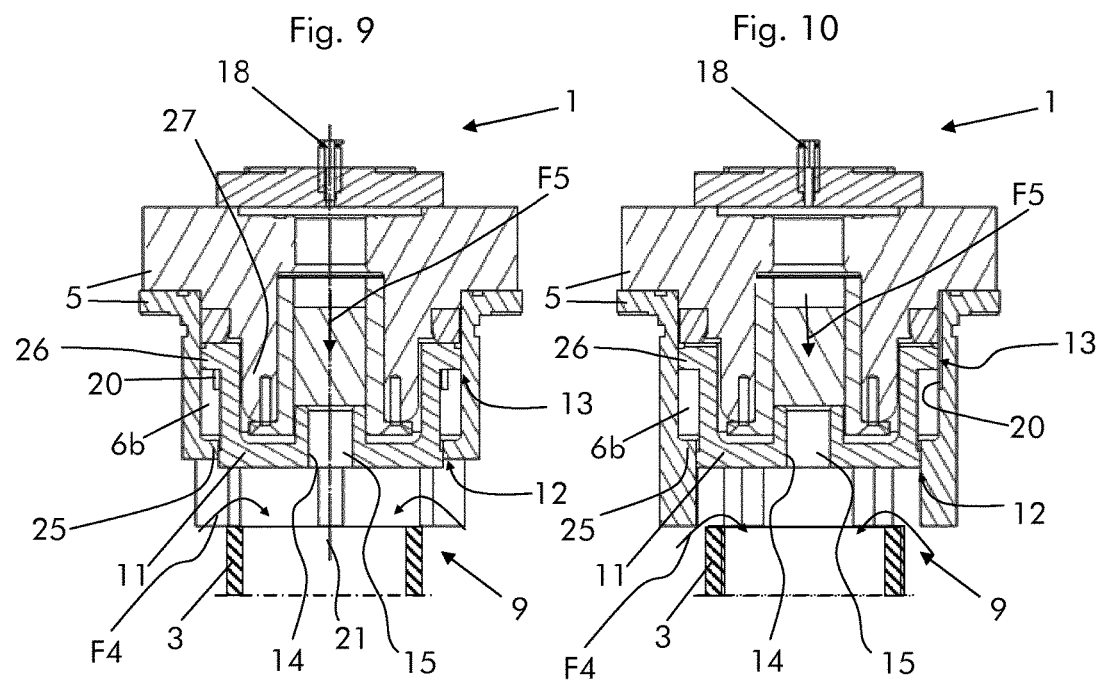
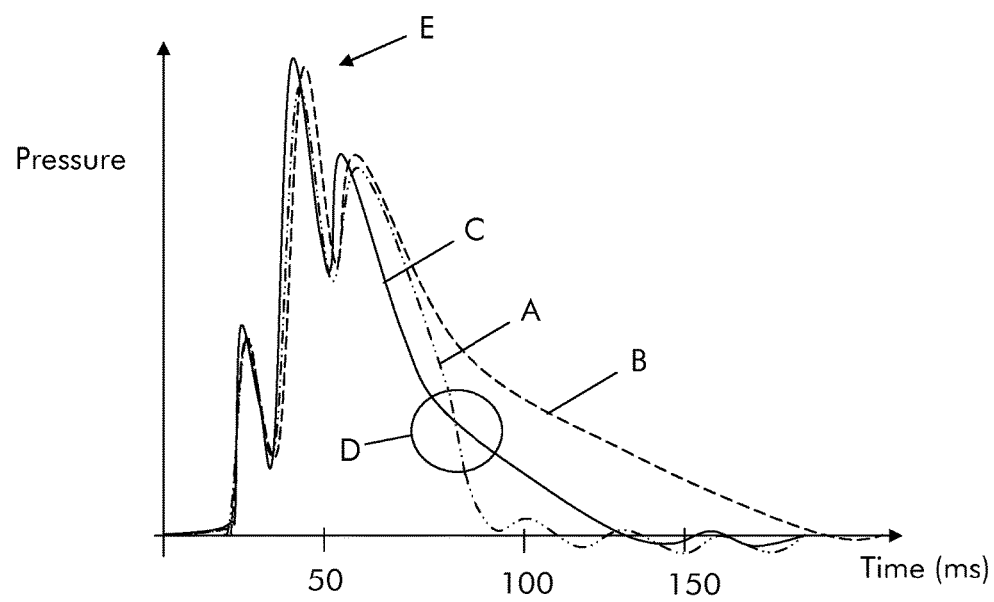
Fig. 11

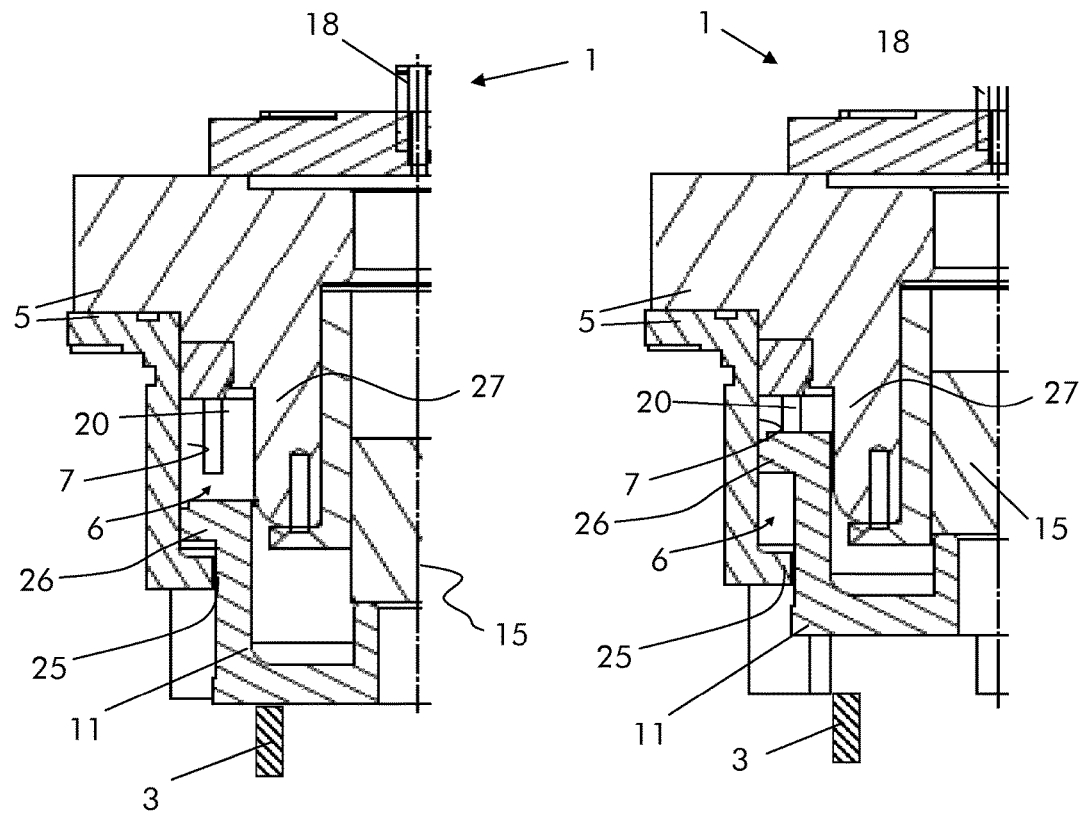
Fig. 12
Fig. 13
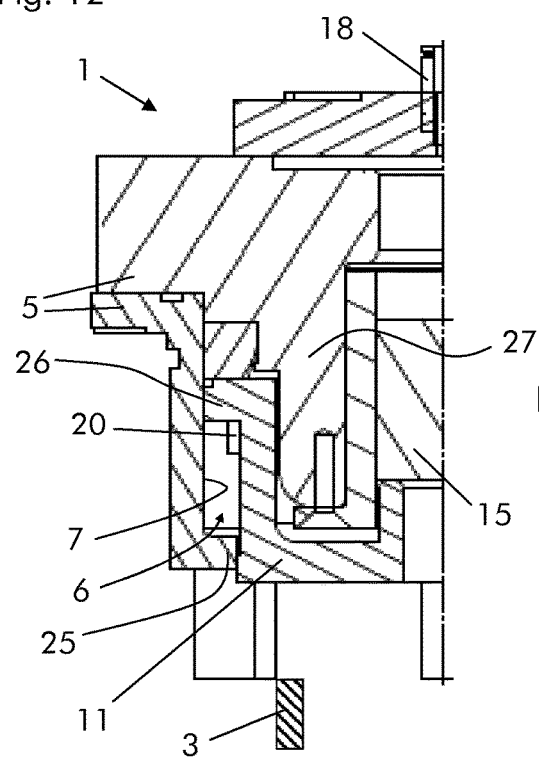
Fig. 14

VALVE

TECHNICAL FIELD

The present disclosure relates to a valve; in particular the valve is of the type usually provided to control the cleaning of the filter bags of fabric filters, such as large fabric filters for cleaning flue gas of power plants or industrial plants. These valves are located between a pressure tank and filter bags, for controlling a flow of compressed air directed through the filter bags in order to clean them and remove dust cakes gathered at the outside surface of the filter bags.

BACKGROUND OF THE DISCLOSURE

Fabric filters usually have a housing in which a plurality of filter bags (up to hundreds or thousands) are arranged. Gas to be cleaned enters the housing and passes through the filter bags, depositing dust on the outside surface of the filter bags; clean gas passes through the filter bags and is thus discharged.

In order to clean the filter bags by removing dust cakes, pressure tanks are provided connected to manifolds having nozzles; valve are provided in order to control the compressed air discharge from the pressure tank.

When the filter bags have to be cleaned, the valve (usually in a closed configuration to prevent compressed air discharge from the pressure tank) is opened and the compressed air passes from the pressure tank through the valve reaching the filter bags, cleaning them and causing the removal of the dust cakes from the filter bags.

The valves have a housing defining a cavity with a plunge slidable within the cavity. A control device is provided, to make the valve to pass from a closed configuration to an open configuration (defined by the position of the plunge) and vice versa. EP 2 816 269 discloses a valve of this type.

Between the plunge and the surface of the housing a gap is defined, to allow compressed gas (e.g. air) to pass from one side of the plunge to the other, allowing valve closing.

The size of the annular gap is desired to be small, because this helps a quick movement of the plunge and thus a quick opening of the valve.

In addition, the size of the gap shall neither be too small, because this would cause defective closing of the valve (e.g. non-closing of the valve), nor too large, because this would prevent opening of the valve because of the leakages.

In practice, the gap size is within a given range. For example the given range can be between 0.15-0.35 millimeters.

BRIEF DESCRIPTION OF THE DISCLOSURE

An aspect of the disclosure includes providing a valve allowing a quick movement of the plunge (e.g. faster than in traditional valvues), but without the problem of defective closing.

These and further aspects are attained by providing a valve in accordance with the accompanying claims.

The valve according to embodiments of the disclosure is an embodiment able to reduce sudden pressure drops at the filter bags, which could e.g. occur during pulsing of the valve.

BRIEF DESCRIPTION OF THE DRAWINGS

Further characteristics and advantages will be more apparent from the description of a preferred but non-exclusive embodiment of the valve, illustrated by way of non-limiting example in the accompanying drawings, in which:

FIGS. 1 and 2 show example a valve connected to a pressure tank;

FIG. 3 shows an example of a valve in a perspective section;

FIG. 4 shows a cross section over line IV-IV of the valve of FIG. 5;

FIGS. 5 and 6 show a section of a valve in the closed configuration over different section planes;

FIGS. 7 and 8 show a section of a valve in a partly open configuration over different section planes;

FIGS. 9 and 10 show a section of a valve in the open configuration over different section planes;

FIG. 11 shows the relationship between pressure at the outlet of the valve and time when the valve is opened;

FIG. 12 is an enlarged view of a part of FIG. 5;

FIG. 13 is an enlarged view of a part of FIG. 7;

FIG. 14 is an enlarged view of a part of FIG. 9.

DETAILED DESCRIPTION

With reference to the figures, these show a valve 1 connected to a pressure tank 2 provided with a pipe 3 for discharging the compressed gas, such as air, contained in the pressure tank 2.

The valve 1 comprises a housing 5 which can e.g. be made in two or more pieces and defines a cavity 6 having a side wall 7, a ceiling 8 and an open end 9.

The valve 1 has a plunge 11 slidable within the cavity 6. In a preferred embodiment, the housing 5 defines a protrusion 27 into the cavity 6, in order to reduce the volume of the cavity; this allows a quicker movement of the plunger 11 and noise reduction. In addition, in an embodiment the plunger 11 is in slidable contact with the wall 7 of the cavity 6. In this case the plunger can have a cup shape, with outer surface sliding against the wall 7.

Gaps 12, 13 are defined between the plunge 11 and the housing 5, in particular between the parts of the plunge 11 and housing 5 is reciprocal sliding contact.

The plunge 11 has an opening 14.

The valve 1 further has a control device for causing the plunge movement; the control device includes a piston 15 slidable in the housing 5 and aligned with the opening 14; in the example shown a cylindrical guide 17 is provided to guide the piston 15; but the guide 17 could not be provided in different examples.

The control device 15 further has a control valve 18, such as an electro valve, which can be opened or closed to cause air entrance into or discharge from the housing 5 from the outside environment.

The attached FIGS. 5-6 show the valve in a closed position in which the plunge 11 rests against the end of the pipe 3, preventing gas passage from the inside of the pressure tank 2 into the pipe 3; FIGS. 7-8 and 9-10 show the valve 1 in a partially open configuration (FIGS. 7-8) and open configuration (FIGS. 9-10); in these configurations the plunge 11 is at a distance from the end of the pipe 3 such that gas passage from the inside of the pressure tank 2 into the pipe 3 is possible (see arrow F4).

The cavity 6 has one or more slots 20 on its side wall 7. For example the slots 20 can be three in number and can be circumferentially spaced by 120 degree. Different number of slots and different angular distance are naturally possible, e.g. one, two or more than three slots are possible.

The slots 20 extend from an intermediate part of the side wall 7 in an embodiment up to the ceiling 8.

In addition, even if any orientation for the slots 20 is possible, in an embodiment the slots 20 are substantially parallel to a longitudinal axis 21 of the valve 1.

In a preferred embodiment, between the first piece and the second piece of the housing 5 a seat is defined and this seat houses a damping element 24, such as a rubber ring. The seat allows to hold the damping element 24 preventing its accidental extraction.

In addition, the housing 5 has a protruding border 25 partly closing the open end 9 and the plunge 11 has a protruding border 26 overlapping the protruding border 25 of the housing 5; this configuration allows to have a valve in one element, such that the plunge 11 cannot escape from the housing when the valve is not connected to the pressure tank 2. In addition, the protruding border 25 gives rigidity against the housing deformation.

In one embodiment, the gap 13 can be the one defining the amount of gas passing from one side of the plunger 11 to the other during operation. For example, the gap 13 can have a size smaller than 0.15 millimeters, e.g. in the range 0.05-0.15 millimeters and in an embodiment about 0.075 millimeters. The gap 12 can be large in order to allow easy gas passage through it and only prevent the plunger 11 from moving out of the cavity 6; for example, the gap 12 can have a size in the range 0.3 to 0.6 millimeters and in an embodiment about 0.4 millimeters. In the following reference to this embodiment is made.

The plunger 11 defines a volume 6a with the ceiling 8 and a volume 6b with the border 25. The volumes 6a and 6b are at opposite sides of the plunger 11.

The gap 13 between the plunge 11 and the housing 5 can be made small and in particular smaller than what required according to the prior art, because the slots 20 allow gas passage between the volume 6a and the volume 6b, so allowing closure of the valve without problems. In contrast, in the prior art the plunger 11 gets stuck due to the restricted flow across the plunger.

The operation of the valve is apparent from that described and illustrated and is substantially the following.

In the closed configuration (FIGS. 5 and 6) the valve 1 has the plunge 11 resting against the end of the pipe 3; the pressure inside the volume 6a is the same as the pressure within the pressure tank 2 (because of the leakages through the gaps 12 and 13 that are not air-tight); the valve 18 is closed (preventing gas exit through it) and the pressure above the piston 15 presses the piston 15 above the plunge 11 and closes the opening 14.

In order to open the valve 1, the valve 18 is opened; this causes gas exit through the valve 18 and thus the movement of the piston as indicated by arrow F1.

The opening 14 is thus opened and the gas contained in the volume 6a moves out of the volume 6a though the opening 14 and pipe 3 as indicated by arrow F2.

Since the pressure in the volume 6a decreases, the plunge 11 moves as indicated by arrow F3, pushed by the pressure within the pressure tank 2 and volume 6b.

When the plunge 11 moves away from the end of the pipe 3, compressed gas contained in the pressure tank 2 moves directly into the pipe 3, as indicated by arrow F4.

Since the gap 13 is small, the movement of the plunge 11 is fast during valve opening. This thanks to the reduced leakage through the gap 13.

The movement of the plunge 11 is fast until the plunge 11 reaches the slots 20.

When the plunge 11 reaches the slots 20 the gas can pass from one side of the plunger to the other (i.e. between the volumes 6a and 6b), in addition though the gap 13, also through the slots 20; this causes a much larger gas leakage between the volumes 6a and 6b than without the slots 20. The consequence is a reduction of the speed of the plunge 11. This helps to get an increased plunger life due the lower stress impact.

Thus the plunge 11 further moves as indicated by arrow F3 until its border 26 reaches the damping element 24.

In the open configuration (FIGS. 9 and 10), compressed gas (e.g. air) is supplied through the valve 18 within the guide 17; this causes the piston 15 to move as indicated by arrow F5. The piston 15 closes the opening 14 and pushes the plunger 11 as indicated by arrow F5, bringing the valve from the open position to the closed position with the plunger 11 resting against the end of the pipe 3.

Since the gas can pass through the gap 13 and the slots 20, the initial movement during the closing of the plunger 11 is fast. Then, when the plunger 11 overcomes the end of the slots 20 (see FIG. 8), the gas leakage from one side of the plunger to the other (i.e. between the volumes 6a and 6b) is reduced, such that the plunger movement becomes slower and closure of the end of the pipe 3 is consequently slow. This results in a soft-landing of the plunger.

Curve A shows the course of the pressure in case of quick valve pulsing (e.g. operation of a valve without slots and gap between the housing wall and the plunger between 0.15 to 0.35).

This figure shows that the pressure undergoes a sudden pressure drop D in the curve A, which can be dangerous for the filter bags and can cause their breakage and higher emission.

Curve B shows the course of the pressure over time when the same valve as the one used to draw curve A is pulsed for a longer duration; this avoids sudden pressure drop D, but it happens at the expense of the compressed air or gas, which is released to the environment.

Curve C shows the course of the pressure over time when the valve is provided with slots 20. In this case, after the pressure peak E, the pressure decreases more smoothly (pressure drop D in curve C) and in particular a sudden pressure drop (like the pressure drop D of curve A) does not occur. This happens because the plunger 11 closes slowly once it overcomes the slots 20 (see FIG. 8). After the slots 20 are overcome, the flow of gas between the volumes 6a and 6b is reduced (flow occurs only through the gap 13) and the plunger 11 closes slowly.

In curve C the peak E is higher than the peak of the other curves A and B because of the higher speed of the plunger 11 during opening before the plunger 11 reaches the slots 20.

In addition, the pulse drops faster at 50 ms to 70 ms because of the higher flow across the slots 20 and the slope of the curve C reduces after 70 ms.

Therefore, the valve of the invention stresses the filter bags to a lower extent, and the lifetime of the filter bags can be increased.

In addition, FIG. 11 shows that when the valve of the invention with the slots 20 is closed (after opening), the pressure within the pipe 3 is high and in particular higher than in case a valve with quick movement of the plunger 11 but without slots 20. Therefore compressed air can be saved and release of compressed air that is not useful to clean the filter bags (mainly the pressure peak is relevant in this respect) is counteracted.

The fact that low pressure downstream of the valve and thus at the filter bags is counteracted has the additional advantage of allowing a reduction of the emissions, which could be caused for example by recirculation of dust due to the low pressure at the filter bags.

Naturally the features described may be independently provided from one another.

In practice the materials used and the dimensions can be chosen at will according to requirements and to the state of the art.

This written description uses examples for the subject disclosure, including the preferred embodiments, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

I claim:

1. A valve comprising
a housing defining a cavity having a side wall, a ceiling and an open end,
a plunge slidable within the cavity,
a control device for causing the plunge movement,
characterised in that
the cavity has at least one slot on the side wall.

2. The valve of claim 1, wherein he at least one slot extends from an intermediate part of the side wall.

3. The valve of claim 1, wherein the at least one slot extends up to the ceiling.

4. The valve of claim 1, wherein the at least one slot is substantially parallel to a longitudinal axis of the valve.

5. The valve of claim 1, wherein
the housing is made in at least two pieces,
between the first piece and the second piece a seat is defined,
a damping element is provided in the seat.

6. The valve of claim 1, wherein
the housing has a protruding border partly closing the open end,
the plunge has a protruding border overlapping the protruding border of the housing.

7. The valve of claim 1, wherein the housing defines a protrusion into the cavity.

8. The valve of claim 1, wherein at least a gap is defined between the side wall and the plunger, wherein the at least a gap has a size smaller than 0.15 millimeters and preferably in the range 0.05-0.15 millimeters and more preferably 0.075 millimeters.

* * * * *